United States Patent
McCauley et al.

[11] Patent Number: 5,102,592
[45] Date of Patent: Apr. 7, 1992

[54] METHOD OF PREPARING CERAMIC POWDER AND GREEN AND SINTERED ARTICLES THEREFROM

[75] Inventors: Ronald A. McCauley, Neshanic Station, N.J.; Remco de Jong, Milford, Conn.

[73] Assignee: Rutgers University, New Brunswick, N.J.

[21] Appl. No.: 601,222

[22] Filed: Oct. 19, 1990

[51] Int. Cl.⁵ .............................................. C04B 35/64
[52] U.S. Cl. .................................. 264/56; 264/125; 427/215; 427/220; 501/97
[58] Field of Search ............ 427/215, 220, 370, 372.2, 427/384; 264/56, 60, 109, 125; 501/97

[56] References Cited

U.S. PATENT DOCUMENTS

| 4,678,761 | 7/1987 | Virkar et al. | 264/125 |
| 4,764,490 | 8/1988 | Yamakawa et al. | 501/97 |
| 4,800,051 | 1/1989 | Yan | 264/56 |
| 4,814,128 | 3/1989 | Lieberman et al. | 264/65 |
| 4,834,928 | 5/1989 | Su | 264/65 |
| 4,985,379 | 1/1991 | Egerton et al. | 427/215 |

FOREIGN PATENT DOCUMENTS 63-303867 12/1988 Japan ...................... 264/56

*Primary Examiner*—Shrive Beck
*Assistant Examiner*—Terry J. Owens
*Attorney, Agent, or Firm*—Joel F. Spivak

[57] ABSTRACT

A method of coating ceramic powders, e.g. $Si_3N_4$, with a sintering aid and of utilizing such coated powders to form green and sintered ceramic bodies comprises treating a dispersion of the powder with a solution of a sintering aid forming compound at a pH such that the zeta potential of the ceramic powder is of opposite charge with respect to the sintering aid in solution such that the sintering aid forming material is chemisorbed as a uniform monomolecular layer on the surface of the ceramic powder.

20 Claims, 2 Drawing Sheets

METHOD OF PREPARING CERAMIC POWDER AND GREEN AND SINTERED ARTICLES THEREFROM

FIELD OF THE INVENTION

This invention is directed to the preparation of treated ceramic powders specifically useful in the manufacture of green and fired dense articles therefrom powders and more particularly to such preparation which includes the use of sintering aids formed on the ceramic powders.

Background of the Invention

Extensive research has been done over the years in an effort to economically and reproducibly produce dense, sintered ceramic articles with a uniform microstructure starting with ceramic powders. Generally, in order to achieve high density, ceramic powders of selected particle size have been treated in various ways including, for example, pressure sintering at high temperature; the mixing of the powders with binders followed by low temperature heat treatment to form a 'green' ceramic article which is then sintered at high temperatures; and the mixing of a flux (sintering aid) with the ceramic particles to reduce the sintering temperatures. To reproducibly manufacture reliable crystalline ceramic articles one must control the characteristics of the starting powder and the forming process parameters such that compacts of uniform high green density with interparticle pore size typically no larger than a single particle are achieved. For reproducible densification with control over the properties of the sintered ceramic one should also control the sintering variables such that pore removal occurs during sintering and grain boundaries develop between the particles.

During powder processing in liquid vehicles, one generally requires a stable particle dispersion, i.e. essentially free of agglomerates. It has been reported that the addition of surfactants to the liquid may be used to attain stability. Ellen S. Tormey, in "The Use of Surfactants in the Processing of High-Technology Electronic Ceramics" states "Achievement of a stable dispersion requires the formation of repulsive interparticle forces. In aqueous systems, electrostatic repulsion is generally dominant and arises due to the interactions between the electric double layers surrounding the dispersed particles. In nonpolar organic media (e.g., hydrocarbons) stability arises due to repulsion between interacting molecules adsorbed onto the particle surfaces and is generally referred to as steric stabilization. As a general rule, in the latter system, the most effective dispersants have strongly adsorbed functional groups and strongly solvated chains which extend into the solvent. Systems which are stabilized by a combination of mechanisms (i.e., charge and steric) tend to be the most stable. Steric stabilization can be effective in both aqueous and nonaqueous media, whereas the electrostatic mechanism is generally only effective in water or polar organic solvents. Most importantly, steric stabilization is effective in dispersions containing high volume fractions of solids, typically used to process ceramics, whereas electrostatic stabilization is generally only effective in dilute systems." She then teaches the use of such organic dispersants for use in particle size classification of ceramic powders. She further teaches "the dispersants typically used in ceramics processing bond to the particle surfaces via hydrogen bonding or weak chemical bonding". She recognizes that "dispersants which can chemically react (couple) with the particle surfaces to form stronger bonds offer distinct advantages in powder processing. Formation of a strong surface chemical bond would ensure that the dispersant remains on the particle surfaces during subsequent processing steps, resulting in a system which is less sensitive to slight compositional or processing condition variations. Coupling agent type dispersants would be especially advantageous in tape casting systems, since they are multicomponent and competitive adsorption is likely to be operative". Parish and Lalanandham have investigated the use of low molecular weight organotitanates as dispersants for ceramic powders ($BaTiO_3$, $Al_2O_3$) in nonpolar organic solvents such as hexane and toluene. When using coupling agents as dispersants for electronic ceramics, the metallic portion of the molecule must not be detrimental to the electrical properties of the ceramic or interfere with the sintering process, since this portion is not removed from the body during sintering. In the case of a metal-oxygen linked organic chain, the dispersant will decompose during sintering to a metal oxide residue.

Forney further teaches that in theory, coupling agents can serve not only as dispersants in ceramics powder processing, but also as dopants and/or binders. Dopants (generally secondary metallic oxides) are often added to ceramic powders to aid in the sintering process. For example, $M_gO$ is a well known sintering aid for $Al_2O_3$; likewise, $Y_2O_3$ is commonly used to enhance the densification of AlN. The addition of such a dopant in the form of a coupling agent would ensure that it is homogeneously distributed in the green body and also the sintered ceramic, since it bonds to the particle surfaces. For use as binders, coupling agents with polymerizable ligands can be synthesized. Such a molecule could first act as a dispersant and then be converted to a binder via an in situ polymerization step.

While much has been learned about the formation of high density sintered ceramic articles, the ability to economically and reproducibly produce such articles utilizing some ceramics, e.g. silicon nitride ($Si_3N_4$), has evaded scientists. Silicon nitride has numerous desirable physical and chemical properties which, if it could be economically and reproducibly manufactured, especially in high density form, would make it particularly attractive in both wear resistant and high temperature applications. High density $Si_3N_4$ ceramic articles have heretofore been difficult to form due to the largely covalent bonding and limited self diffusion, requiring not only high temperatures but pressure as high as 1.5 GPa. Dense $Si_3N_4$ has been obtained by the use of powdered additives which, during the sintering process, provide a liquid phase to promote densification. However, the previously employed additives also introduce unwanted secondary phases which deteriorate the high-temperature mechanical properties of the densified material. Such prior art powdered additives have generally been employed in amounts ranging from 5-20+ weight % depending on the densification procedure, e.g. pressureless sintering, high pressure sintering, hot-pressing, and hot-isostatic pressing. The additives have most often been added by ball or attrition milling with the ceramic powder. This can adversely affect the characteristics and purity of the powder and distribution of the additives is not uniform. Another method reported in the literature for introducing the additive is the precipitation of the additive from a dispersion containing the Si₃N₄ powder, however, while the additive is introduced somewhat more uniformly by this method, excessive shrinkage during sintering was encountered.

The method of the present invention incorporates sintering aid additives in a controlled, uniform, reproducible manner, providing a liquid phase at the sintering temperature which is in uniform and intimate contact with the ceramic powder grains, thus improving the kinetics for densification and transformation and allowing for the economical and reproducible formation of densified green or sintered ceramics, including silicon nitride, from powdered starting materials.

SUMMARY OF THE INVENTION

The invention disclosed and claimed herein involves (1) the production of treated ceramic powder particles characterized by an essentially monomolecular layer of a sintering aid or sintering aid forming compound uniformly chemisorbed on the surface of the powder particles; (2) the formation of a green ceramic article from the treated powder; and (3) the formation of a dense sintered ceramic article from either the green ceramic article directly from the treated powder.

The treated ceramic powder is formed by (1) preparing a stable dispersion of a ceramic powder in a liquid media which contains, totally dissolved therein, a soluble compound which contains a metal ion which can form part of a sintering aid for said ceramic powder wherein said ceramic powder has a zeta potential which is displaced from the iso-electric point when at the pH of the liquid media and where the soluble compound does not precipitate out of the solution at said pH and where the metal ion is chemisorbed onto the surface of the powder in a manner such that upon subsequent heating of the powder after separation from the liquid media, a uniform essentially monomolecular layer of the sintering aid is formed on the surface of the powder and (2) separating the treated powder from the liquid media leaving the chemisorbed layer on the powder.

The treated powder may be stored or sold in the form with the chemisorbed layer or may first be dried and/or heat treated to obtain the final sintering aid thereon. One may continue processing the powder having the chemisorbed layer or sintering aid thereon such as by forming the powder into a desired shape and heating to obtain a green ceramic article having a sintering aid uniformly absorbed on the powder particle surfaces. Alternatively, one can fire the formed particles at the appropriate sintering temperatures and pressures before or after formation of a green ceramic article to obtain a high density sintered ceramic product.

It should be understood that the treated powder as well as the green ceramic article or the high density sintered ceramic product is capable of being sold as an item of manufacture.

DETAILED DESCRIPTION OF THE INVENTION

Figure 1:
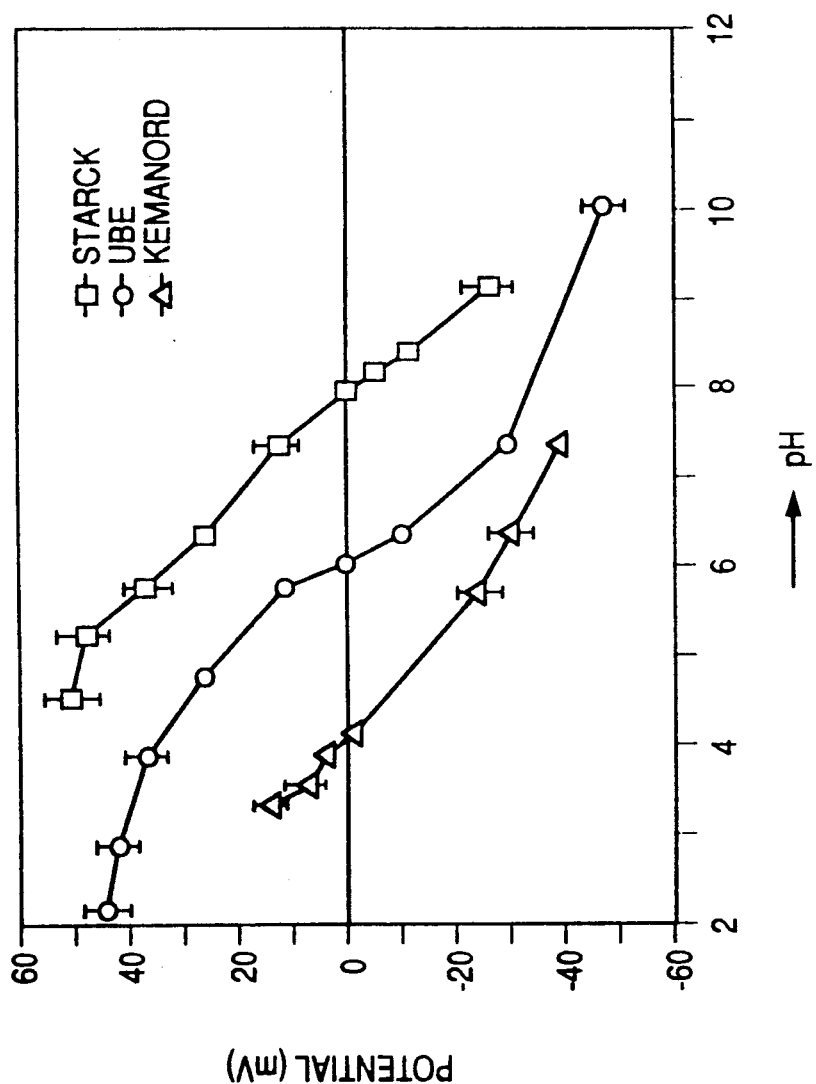
FIG. 1 is a plot of Zeta potential in millivolts vs. solution pH for three different silicon nitride powder samples.

Generally, in order to make a high density ceramic article from a ceramic powder in accordance with the present invention one preferably first disperses the powdered ceramic starting material in a liquid media and, while preventing agglomeration of the particles e.g. by ultrasonic vibration, adds a solution having a compound dissolved therein which is chemisorbable on the surface of the ceramic powder particles and which, when the particles are separated from the liquid media and heated, form an essentially monomolecular uniform layer of a sintering aid on the surface of the powder. A preferred class of compounds for this purpose are organo-metallic surfactants. However, soluble inorganic salts such as the nitrates of the desired metal-ion sintering aid are also suitable. The most suitable organometallic surfactants are preferably compounds wherein the metal ion does not form a fully coordinated complex with the organic ligand of the surfactant and where the metal is strongly associated with an atom, such as an oxygen or nitrogen atom, on the ligand. The oxygen (or nitrogen) atom strongly bonds to the surface of the ceramic, while the metal-ligand bond is a weaker bond that readily dissociates upon heating so that a uniform monolayer of a metal-oxide (or metal-nitride) sintering aid remains uniformly dispersed over the surface of the powder particles. The organic ligand portion of the surfactant is one which is associated with the solvent so as to be soluble therein. Further, the organometallic surfactant preferably forms a polymeric type of molecule in the solvent which promotes a uniform coating of the metal-oxygen over the entire surface of each particle.

Whatever the chemisorbable compound may be, it is important that it have a charge in solution which is opposite the zeta potential of the ceramic powder surface at the pH of the dispersion containing the powder and the dissolved chemisorbable compound, and that the pH be such that the chemisorbable compound is stable and does not precipitate from the solution. By way of example, referring to FIG. 1 there is shown the zeta potentials of three different silicon nitride particle dispersions as a function of pH. The particles are named according to their respective sources. The Starck particles in the negative zeta potential range are the most difficult to work with in that the pH to maintain negative zeta potential stability must be maintained at greater than about 8 and hence the chemisorbable compound should show a positive charge and be stable in solution at pH's in excess of 8. This is considerably more difficult to achieve than if one utilized the Kemanord silicon nitride wherein negative zeta potentials are attained at pH's in excess of 4 and hence the chemisorbable compound need only be stable at pH's in excess of 4 to be suitable. It should be noted that one could employ particles at pH's wherein the zeta potential is positive. However, when the zeta potential is positive the sintering aid source should exhibit a negative charge in solution so as to readily chemisorb to the surface of the particle.

After exposure of the dispersed ceramic powder to the surfactant (or other chemisorbable compound), the powder is then separated from the liquid, such as by centrifugation followed by decantation of the supernatant liquid, or by filtration. The powder may then be washed to remove excess surfactant so as to leave a uniform, thin (monolayer) of the surfactant over the ceramic particles. The coated particles are then heated to a temperature which causes dissociation of the surfactant such that the ligand portion is removed leaving a substantially monomolecular layer of sintering aid uniformly over the particles.

The particles may be formed into desired shapes from which a green ceramic is formed e.g. by slip casting, molding, pressing or any of the methods which are well known in the art either prior to or subsequent to the dissociation of the surfactant. However, this is preferably done prior to such dissociation. The green ceramic having each particle uniformly coated with sintering aid is then fired at high temperature, with or without pressure, to form a high density sintered ceramic article. Alternatively, one can fire the pressed treated particles directly to form a high density article without first forming a green ceramic article.

Figure 2A:
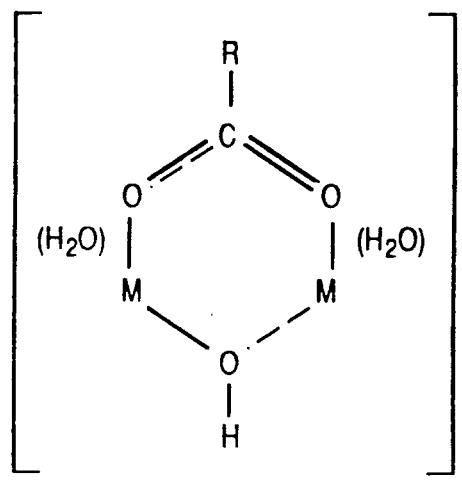
FIG. 2(a) 2(b) and 2(c) is a representation of one possible theoretical model for a powder-surfactant interaction leading to the formation of a uniform monolayer of a metal-oxide sintering aid on the surface of the powder particles employing an organometallic surfactant.
Figure 2B:
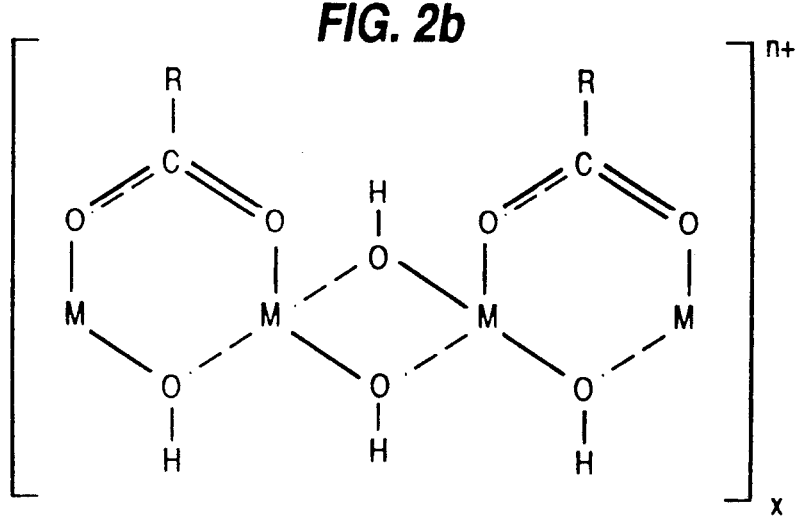
Figure 2C:
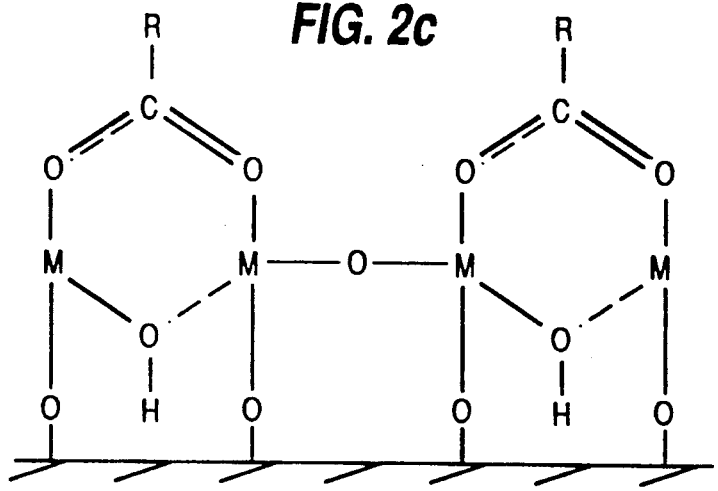

A possible model which is proposed for the powder-surfactant interaction is shown in FIG. 2 for an organo-surfactant in an aqueous media having an oxygen-metal bond which attaches to the surface of the ceramic powder. R—C— in FIG. 2 represents the organic ligand. As can be seen, the surfactant molecule shown in FIG. 2(a), forms a polymeric unit in the aqueous media in which it is dissolved, as shown in FIG. 2(b). As shown in FIG. 2(c), the oxygen atoms attached to the metal atom, M, which are remote from the body of the ligand, become strongly bonded to the surface of the powder. Upon heating, the surfactant dissociates leaving a uniform M-O-powder configuration. It should be understood that the model set forth herein is presented merely as a suggested explanation of the operation of the invention for an organometallic surfactant chemisorbable compound and is not meant to limit the invention to such model.

The following sets forth the preferred embodiment of the invention for use in forming densified, high strength, silicon nitride ($Si_3N_4$) ceramic articles. This is preferably accomplished by the use of a water soluble cationic or non-ionic surfactant which contains a metal-oxygen bond which forms a metal-oxide sintering aid upon dissociation of the surfactant molecule. Alternatively, one can employ a nitrate such as chromium nitrate as the source of the sintering aid for silicon nitride. The nitrate used should not precipitate out of the solution at the operating pH. Hence, yttrium and magnesium nitrates are generally unsuitable for use. The preferred surfactants are metallo-organic complexes having hydrated metal ions as an anchor group available for bonding to the surface of the ceramic powder. As previously indicated, the metal ions in the useful surfactants are preferably not fully coordinated with the ligand since such fully coordinated metal-organic coordination complexes give rise to weak hydrogen bonding with the powder surface as opposed to the stronger chemical oxygen bonding obtained by use of the surfactants taught herein. These organic surfactants provide greater suspension stability as compared with the nitrate as well as forming stronger bonds with the particle surface. Examples of suitable surfactants include, but are not limited to, methacrylate metal halide hydroxide, metal formates, metal lactates and mixtures thereof wherein the metal ion is preferably chromium, aluminum, magnesium or a mixture thereof. It should be understood that the particular metal ion employed for forming the sintering aid depends upon the particular ceramic powder composition. In the case of $Si_3N_4$, the preferred surfactant comprises, but is not limited to, a solution of methacrylate chromium chloride hydroxide, chromium acetate or aluminum lactate or mixtures thereof. This system is stable under normal processing conditions and strongly interacts with the $Si_3N_4$ powder surface, especially when such surface is predominantly a silenol surface due to exposure of the $Si_3N_4$ to water or water vapor. Processing was generally performed with a minimum amount of additives. The treated powders are then preferably first slip cast followed by sintering under various conditions. Sintering characteristics were assessed by density, E-modules, hardness, $K_c$, x-ray diffraction, modulus of rupture and SEM.

EXPERIMENTAL

GENERAL PROCEDURE

Unless otherwise set forth the experimental results which follow employed the Kemanord powders referred to in FIG. 1 and sometimes hereinafter designated as powder A. Powder B is the UBE source powder whose zeta potential is also shown in FIG. 1.

$Si_3N_4$ powders having a BET surface area of about 10 $m^2/g$ were dispersed in deionized distilled water and exposed to ultrasonic agitation to break-up weak agglomerates. An aqueous surfactant solution was prepared and was then added to the ceramic dispersion. The surfactants employed were selected from methacrylate chromic chloride hydroxide, a chromium acetate or formate and an aluminum lactate and mixtures thereof. These surfactants are hereinafter designated as S1, S2 and S3, respectively. The S1 monomer contains two chromium atoms, sixfold coordinated by an alkyl group, R, OH-groups, chloride and a short chain-length radical. The complex is completely soluble in an aqueous medium. Dilution with water replaces the alcohol groups and part of the chlorine atoms with aquo groups. Hydrolysis causes more chlorine atoms to enter the aqueous medium as chloride ions. Once the aquo groups lose protons, hydroxyl bridges form. Increased growth by polymerization makes the molecules more positively charged, therefore resulting in strong chemisorbed bonds with powder particles having a negative zeta potential.

The described surfactant offers the advantage of both stabilizing the powder dispersions and incorporating trivalent chromium oxide and aluminum oxide sintering aids onto the negatively charged particle surface. FIG. 1(c) shows the predicted interface interaction; the positive charge on the molecules makes the chromium bond to the negatively charged surface. The chlorine atoms enter the dispersion as chloride ions. The presence of chlorine, especially related to reaction to HCl, in the final microstructure should be avoided. This can be done by washing the treated powder. The S2 monomer contains three chromium atoms and the S3 monomer is an aluminum surfactant having three aluminum atoms in the monomer.

The high melting points of chromium compounds makes it preferable to use an additional sintering aid. Magnesium or aluminum can be used to both promote formation of a liquid phase during sintering and give liquid immiscibility, needed to control the final microstructure. These additives also should be added as organic complexes to allow control over both the colloidal chemistry of the system and the final microstructure.

Addition of 0.15 mol % of the S1 Cr-complex to 1 gram silicon nitride powder (S.A.=10M$^2$/gr.), corresponding to an average calculated coverage of 1.5 to 2.0 sites/nm$^2$ resulted in a uniformly coated powder. More complex resulted in an excess which remained in solution after centrifugation. Dispersions with 0.03–0.12 vol % can easily be prepared and remain stable for several weeks, once agglomerates have settled. The stability of aqueous solutions of the S1 Cr-complex (as with other metal organic surfactants) depends, among other things, on the pH and age of the solution. Solutions and, in this case, the dispersions, become more acidic in time, because protons are produced during the polymerization of the complex. Proper pH-control allows colloidal size molecules, without precipitation. If base is added in excess, or at the wrong time in the process (i.e. when the pH is too high), precipitation is more likely to take place. By preparing the surfactant solution and dispersion separately and then mixing the two, better control over the pH of the Cr-containing solution is achieved and the possibility to deagglomerate the silicon nitride powders e.g. by ultrasonic agitation, as much as possible, is attained.

Upon addition of the dispersion to the complex solution, (or vice versa) the pH of the resulting dispersion changed to and remained at pH 6.0–7.0. The pH of the initial dispersion, before addition to the complex solution, is important with respect to electrostatic stabilization and possible polymerization once the dispersion is added to the complex solution. Polar surface sites or a slightly negative net surface charge will promote interaction with the complex molecules. The cationic group of the complex is expected to interact with the silanol sites at the particle surface. Both this and the possible precipitation at excess base impose certain requirements with respect to the powder dispersion. For example, the pH should be in excess of the isoelectric point of the silicon nitride powder and no base should be added to the dispersion since unwanted precipitation is likely to occur.

The pH of the dispersion was then adjusted with 10$^{-2}$M NH$_4$OH to a value close to the iso-electric point (IEP) value. The system was centrifuged and the supernatant, which contains any excess surfactant, was decanted. The powder was then redispersed in water and the pH adjusted away from the IEP value. Powders taken from slips before and after centrifuging were used for mobility measurements in a 10$^{-3}$M KCl or KNO$_3$ aqueous system and for TEM, ESCA, FTIR, and thermal analysis (TA:TGA/DSC). To check for the stability of the system centrifuging and redispersion of the powders was repeated up to five times and the pH was varied between 3 and 11. Potentiometric titration was used to monitor the changes in the surface potential of the powder while the surfactant solution was introduced. Slip viscosities were measured as a function of pH, temperature and surfactant. The slip was then cast into discs 25×10 mm. The discs were oxidized at 500° and 675° C. for up to 36 hours and analyzed by ESCA and SEM. The discs were pressureless sintered at 1730° C. up to 6 hours under 0.1 MPa ultra-high purity nitrogen in a tungsten crucible and tungsten lined furnace, using a Si$_3$N$_4$ powder bed. Hot isostatic pressing was also used at 1950 C. for 1 hour under 200 MPa in a BN powder bed. The sintered discs were analyzed by SEM, ESCA and XRD. The density (water immersion), microhardness (Vickers indenter), E-modulus (sonic velocity delay) and K$_c$ (indentation) were determined. A few discs prepared from dry-pressing ball-milled mixtures of Si$_3$N$_4$ powder, both with and without surfactant, and with high-purity magnesia (SA=35 m$^2$/gr) and alumina powder (SA=10 m$^2$/gr) were also sintered under 0.1 MPa nitrogen for 8 minutes at 1730° C. for comparison.

RESULTS

Most of the data was collected on powder designated, powder A while some data was also collected on powder B. Transmission electron microscopy (TEM) showed significantly different powder morphologies. Powder A has a large number of platelets, both submicron and up to 1-2 micron in size. Electron diffraction identified both the alpha and the beta phase. In addition, irregularly shaped particulates were observed. Powder B showed equiaxed particulates, but also contained a small amount of Si$_3$N$_4$ whiskers. Both powders behaved acidic in water, and stable dispersions resulted at pH values in excess of 8. TEM samples prepared from these electrostatically stabilized dispersions showed mostly submicron agglomerates, but a number of considerably larger agglomerates was present as well. Samples taken of coated powders showed a smaller average agglomerate size, and hardly any large clusters were observed.

Addition to the concentrated surfactants (i.e. not in solution) lowered the pH of the dispersions considerably due to initial polymerization of the surfactant molecules. Powder-surfactant interactions were obvious from potentiometric titration and acoustophoretic mobility data that showed a change in the sign of the powder mobility and the phase of the monitored signal upon addition of the surfactant, lowering the pH. However, suprisingly, increased interaction was obtained with surfactants in solution. These solutions added to the powder dispersion showed maximum interaction as indicated by rapid mobility and phase changes. This was confirmed by ESCA data; the latter process gave powders with consistent, reproducible amounts of additive. Precipitation of surfactant molecules due to the addition of excess base had to be avoided because precipitates would act as imperfections in the cast microstructure. Precipitation occurred at a pH in excess of 8.4 for all of the surfactants. The IEP of the surfactants was around pH 7.5–8, and the IEP of a coated powder dispersion shifted to these values. Exposure to excess acid or base during mobility measurements, as well as repeated centrifuging and redispersing, did not alter the IEP values nor the ESCA values. This behavior indicated that, once proper processing put the surfactants onto the powder surface, they were stable against processing conditions. Potentiometric titration data indicated that formation of hydroxyl bridges increased the net effective charge on a surfactant molecule. That resulted in the higher degree of interaction with the powder surface upon addition of base. This data also showed a saturation concentration of surfactant added (0.15 mol/gr silicon nitride), in excess of which the mobility did not further increase. This concentration was used to minimize the amount of excess surfactant to be removed by centrifuging and was used for the calculation of the amount of surfactant at the powder surface. The coated powders had higher surface potentials than as-received powders, and stable dispersions were obtained containing up to 50 wt % solids.

Rheology measurements showed that slips of coated powders had lower viscosity than electrostatically stabilized slips of as-received $Si_3N_4$. The latter showed pseuo-plastic behavior for 65 and 68 wt % slips at pH 9.3. Lowering the pH to 4 and 2.7 increased the viscosity of the system orders of magnitude due to the reduction in surface charge. Coated systems showed a similar response to the reduction in surface charge. Coated systems showed a similar response to pH changes, indicating electrostatic stabilization as well. Increasing the temperature for slips with a minimum viscosity did not show a sudden viscosity increase over the temperature range investigated (23° C.-95° C.). The latter would occur for steric stabilized particles in an aqueous system, assuming enthalpic stabilization to be predominant. In addition, dispersions agglomerated and settled rapidly at or near the IEP of the coated powder, again indicating predominantly electrostatic stabilization. The surfactants used were initially all monomeric short-chain-length complexes. These complexes are somewhat polymerized upon dilution and pH adjustment in preparation of a working solution. Though no direct evidence was presented, a steric contribution to the stabilization of these systems can not be ruled out based on rheology data.

The amount of additive introduced into the system was calculated for the various surfactants using the saturation concentrations obtained from potentiometric titration and repeated centrifuging as well as using ESCA, quantitative SEM-microprobe analysis, and thermal analysis data. The calculated amounts were in close agreement and are presented in Table 1 as mg $M_2O_3$ per gram of $Si_3N_4$ powder. The number of surface sites needed to accommodate the amounts of additive listed would be 2.8–3.5 sites $nm^{-2}$.

TABLE 1

| Data on surfactants (M-[organic]) investigated | | | | | |
|---|---|---|---|---|---|
| Surfactant | Label M. | #M | organic | IEP | mg $M_2O_3$/g $Si_3N_4$ |
| Methacrylic acid | S1 Cr | 2 | $C_4H_5O_2$ | 8.0 | 4.5 ± 0.5 |
| Formate | S2 Cr | 3 | $C_6H_6O_{13}$ | 7.5 | 4.0 ± 0.8 |
| Lactate | S3 Al | 3 | $C_3H_5O_3$ | 8.1 | 4.0 ± 0.8 |

Various systems were sintered at 1730°–1950° C. The results of these experiments are summarized in Tables 2 and 3. The green densities were 52–58% of theoretical.

TABLE 2

| | Data on discs sintered for 8 min. at 1730 C. under 0.1 MPa Nitrogen | | | | |
|---|---|---|---|---|---|
| System | 2 wt % MgO | 2 wt % MgO + S1 | 4 wt % MgO | 4 wt % MgO + S1 | 4 wt % MgO + S3 |
| Density (% theor). | 78.5 | 85.8 | 84.1 | 93.2 | 92.9 |
| E-mod. ($GNm^{-2}$) | — | 175 ± 15 | — | 240 ± 10 | 265 ± 9 |

The presence of the surfactant at the powder surface was shown by FTIR, ESCA, and TEM analysis. FTIR showed adsorption bands for coated powders that corresponded to a few strong bands (1600–1200 $cm^{-1}$) for the pure surfactant solutions, after subtraction of the solvent. The OH-stretching band at 3743 $cm^{-1}$ was weakened and a new, weak band appeared around 3010 $cm^{-1}$. This indicated interaction of surfactant (metal) ions with surface silanols. The weak band resulted probably from perturbed surface hydroxyl groups.

Electron diffraction in the TEM indicated the presence of a crystalline phase, not present in as-received powders. Identification of the crystalline phase was possible using ESCA binding energy data. The coated systems had the additive as a metal hydroxide on the surface. For S1, for example, the O1s values were 532.6 eV with a shoulder at 531.1 eV, indicating $SiO_2$ and $Cr(OH)_3$, respectively. The Cr2p values were 577.3, from $Cr(OH)_3$, or 577.7 eV, indicating the interaction with the organic group. The Si2p peak at 101.9 eV had a shoulder at 103.3 eV, from $Si_3N_4$ and $SiO_2$, respectively. The oxidized and sintered system showed the shoulder for Si2p at 102.7 eV, probably due to silicon oxynitride. The O1s values were 532.5 and 531.6 eV and the Cr2p value was 577.1 eV. The latter two correspond to values for $Cr_2O_3$. The conversion to the metal oxides due to oxidation was confirmed by FTIR analysis of oxidized, pure surfactants. Thermal analysis showed a weight loss and exothermic transition for the coated powders below 400 C., indicating the combustion of the organic. No further weight loss occurred after 24 hours at 500/675 C., indicating the completion of the oxidation treatment. The amount of residual carbon in the oxidized discs were less than 1 wt %.

The rather small amount of additive that could be incorporated (Table 1) did not provide very high densification by pressureless sintering, making high pressure sintering the choice for very high densification. The coated systems did transform to the Beta phase, but the final pressureless sintered density was limited to 62%th after 6 hours at 1750 C. Systems S2 and S3, which were designated so as to introduce three metal atoms per monomer, did not give better results. The microstructures showed rather coarse elongated Beta grains and mostly open porosity. However, substituting the surfactant for a fraction of the additives conventionally incorporated by ball-milling improved sintering results.

Three systems, MgO, $MgO-Al_2O_3$ and $MgO-Cr_2O_3$, were selected and sintering cycles were taken from data in literature for these systems. The results in Table 2 show the increase in density with the addition of S1 coated powder ball milled with MgO. Densification was limited both because of the decomposition and evaporation of MgO and because the total amount of additive from S1 was limited. Increasing the amount of MgO ball-milled into the coated system to 4 wt % resembles systems reported in literature with maximum densities of 86%th. Again addition of S1 clearly gave better results. To see whether the increase in the amount of additive by 0.45 wt % from S1 caused this improvement, discs with 0.5 wt % $Cr_2O_3$ and 4 wt % MgO were sintered as well. Densities were comparable with the 4 wt % MgO system. The use of S3 with 4 wt. % MgO also gave better results than only a 4 wt % MgO ball-milled system. Comparing S1 and S3 showed that their effect on the MgO system was similar. In addition, the final density under the sintering conditions listed was higher with 2 wt % MgO+S1 than with 4 wt % MgO. The phase equilibrium diagrams did not predict an increased amount of liquid formation at 1730 C. for the S1 system.

The data in Table 3 shows that fully dense materials were obtained using the conditions and systems listed. The data listed in Table 3 is comparable to or better than data reported in literature for HIPed systems, containing considerably larger amounts of additives. System A+S3 sintered to only 95.6% th when the pH of the surfactant solution was not raised, causing a decrease in the amount of additive introduced. This indicated that for a 10 m$^2$/g powder the amounts listed in Table 1 approach the minimum amount of additive needed, if uniformly distributed.

TABLE 3

Data on discs HIPed for 60 min. at 1950 C. under 200 MPa. Nitrogen

| System | Density (%) | H$_v$ (GNm$^{-2}$) | E (GNm$^{-2}$) | K$_c$ (MNm$^{-3/2}$) |
|---|---|---|---|---|
| pwd A + S1 | 100 | 19.2 ± .6 | 315 ± 3 | 4.8 |
| pwd B + S1 | 100 | 19.1 ± .5 | 305 ± 5 | 4.8 |
| pwd A + S2 | 100 | 18.4 ± .4 | 300 ± 5 | 4.1 |
| pwd A + S3 | 100 | 19.5 ± .5 | 297 ± 2 | 5.3 |

Referring to Table 4, there is shown comparative results of densification for green and sintered silicon nitride powders having sintering aids incorporated therein mechanically, i.e. by ball milling, by the precipitation of the sintering aid in a dispersion of the ceramic powder, and by coating in accordance with the present invention.

TABLE 4

Green and Sintered Densities for Compositions with ≦ 1 wt % Me$_x$O$_y$ 6 hrs, 1750° C., 0–1 MPa N$_2$

| Incorporated by: | Me$_x$O$_y$ | wt % | Max. Green ρ % Theoretical | Sintered ρ % Theoretical |
|---|---|---|---|---|
| Ball Milling | MgO | 1 | 54 ± 2 | 64 ± 1* |
|  | Al$_2$O$_3$ | 1 | 54 ± 2 | 68 ± 1 |
| Precipitation | Cr$_2$O$_3$ | 1 | 51 ± 2 | 65 ± 1 |
|  | MgO | 1 | 50 ± 2 | 63 ± 1 |
| Coating | Cr$_2$O$_3$ | 0.45 | 59 ± 2** | 73 ± 1*** |
|  | Cr$_2$O$_3$ | 1.1 | 59 ± 2 | 76 ± 1 |
|  | Al$_2$O$_3$ | 0.1 | 59 ± 2 | 65 ± 1 |

*2 hrs, 1750° C.: 67 ± 1%
**CIP'ed: 61 ± 1%
***CIP'ed: 74 ± 1%

As can be seen from Table 4, the addition of small amounts of sintering aid in accordance with the present invention resulted in higher density green and sintered ceramic articles as compared with other methods of incorporating even greater amounts of the sintering aids.

Table 5 tabulates the experimental results of certain properties of various hot isostatically pressed silicon nitride powders treated in accordance with the present invention and sintered at 1950° C. for 1 hour at a pressure of 207 MPa. These powders were first densified to a green state having a density of 59 ±2% of theoretical.

TABLE 5

Density (ρ), Vickers Hardness (H$_v$), Elastic Modulus (E), and Indentation Toughness (K$_C$) for HIP'ed Compositions; 1950° C., 1 hr, 207 MPa (Green Densities 59 ± 2% Theoretical)

| Powder/Complex | ρ % Theo. | H$_v$ GNm$^{-2}$ | E GNm$^{-2}$ | K$_C$ MNm$^{-3/2}$ | MOR MPa |
|---|---|---|---|---|---|
| A/S1 | 100 | 18.6 ± 0.2 | 315 | 3.81 | 610 ± 5 |
| B/S1 | 100 | 18.5 ± 0.2 | 305 ± 5 | 3.80 | — |
| A/S2 | 99.3 ± 0.2 | 17.6 ± 0.3 | 293 ± 5 | 3.29 | — |
| A/S3 | 100 | 19.1 ± 0.3 | 297 ± 2 | 4.02 | — |
| A/Cr(NO$_3$)$_3$ | 100 | 18.4 ± 0.3 | 308 ± 2 | 3.58 | — |
| A | 98.6 | 16.1 ± 0.4 | 286 ± 3 | 2.57 | — |
| B/S3 | 100 | 19.0 ± 0.4 | 297 ± 3 | 5.00 | 591 ± 7 |

What is claimed is:

1. A method of making a treated ceramic powder suitable for densification having a sintering aid or sintering aid forming compound chemisorbed on the surface of the powder as an essentially uniform monomolecular layer comprises (1) forming a treated powder by preparing a stable dispersion of a ceramic powder in a liquid media which contains, totally dissolved therein, a soluble compound which contains a metal ion which can form part of a sintering aid for said ceramic powder wherein said ceramic powder has a negative zeta surface potential at the pH of the liquid media and where the soluble compound does not precipitate out of the solution at said pH and where the metal ion is chemisorbed onto the surface of the powder in a manner such that upon subsequent heating of the powder after separation from the liquid media, a uniform essentially monomolecular layer of the sintering aid is formed on the surface of the powder and (2) separating the treated powder from the liquid media leaving the chemisorbed layer on the powder.

2. The method recited in claim 1 further including, after said separating step, the steps of forming the powder into a desired shape and sintering the powder to form a dense ceramic article.

3. The method recited in claim 1 including the step of drying the treated powder.

4. The method recited in claim 1 wherein the ceramic powder is silicon nitride, said liquid media is water, said soluble compound is selected from chromium methacrylate, chromium formate, aluminum lactate and mixtures thereof and the pH is greater than 6.

5. A method of making a ceramic article comprising (1) forming a treated powder by preparing a stable dispersion of a ceramic powder in a liquid media which contains, totally dissolved therein, a soluble compound which contains a metal ion which can form part of a sintering aid for said ceramic powder wherein said ceramic powder has a negative zeta surface potential at the pH of the liquid media and where the soluble compound does not precipitate out of the solution at said pH and where the metal ion is chemisorbed onto the surface of the powder in a manner such that upon subsequent heating of the powder after separation from the liquid media, a uniform essentially monomolecular layer of the sintering aid is formed on the surface of the powder, (2) separating the treated powder from the liquid media leaving the chemisorbed layer on the powder, and (3) subsequently forming the powder, while wet, into a desired shape and heating the shaped powder to form a green ceramic article having the sintering aid uniformly bonded to the surface of particle grains of the green ceramic article.

6. The method recited in claim 5 further including the step of sintering the green ceramic article.

7. A method of making a $Si_3N_4$ powder suitable for producing densified $Si_3N_4$ articles comprises (1) preparing a dispersion of a silicon nitride ceramic powder in a liquid media containing a soluble organometallic surfactant having an organic ligand therein wherein the powder has a negative zeta potential at the pH of the dispersion and the surfactant is stable at said pH and wherein the metal ion of the surfactant is not fully coordinated by atoms of the organic ligand of the surfactant and wherein the surfactant is chemisorbed on the surface of the ceramic powder particles in a manner such that upon subsequent heating of the powder, the surfactant dissociates so as to leave a uniform, essentially monomolecular layer of a metal-anion sintering aid on the surface of the powder particles, the concentration of surfactant in said dispersion being in excess of the minimum amount required to uniformly coat said powder particles, (2) treating the powder articles so as to reduce agglomeration of said particles during preparation of the ceramic powder, (3) adjusting the pH of the dispersion so as to prevent precipitation of surfactant, and (4) separating the surfactant treated powder from the liquid, leaving a film of chemisorbed surfactant on said powder particles.

8. The method recited in claim 7 wherein the zeta potential of the powder is negative at pH 6.

9. The method of claim 8 wherein the surface area of the powder particles is at least 10 $m^2/g$.

10. The method of claim 8 wherein the metal ion of the organometallic surfactant includes chromium and wherein the portion of said surfactant having said chromium ion thereon in solution is positively charged so as to form a chemical bond to the negatively charged surface of said powder particles.

11. The method of claim 10 wherein the surfactant further includes at least one metal ion selected from the group consisting of aluminum and magnesium.

12. The method of claim 10 wherein the surfactant includes at least one member of the group consisting of a methacrylate, formate, lactate and acetate.

13. The method of claim 10 wherein at least a portion of the chromium is present as methacrylate chromium chlorohydroxide.

14. The method recited in claim 10 wherein the chromium is trivalent.

15. The method recited in claim 7 wherein the liquid media includes a plurality of organometallic surfactants having metal ions associated therewith, said metal ions consisting essentially of trivalent chromium together with at least one of aluminum and magnesium ions and the organic ligand consists of a formate, acetate or lactate together with a chromic methacrylate.

16. The method recited in claim 10 wherein the organometallic surfactant includes chromium (III) chlorohydroxmethacrylate and the concentration of surfactant is approximately 0.15 mol %.

17. A method for coating the surface of a ceramic powder with an essentially uniform monomolecular layer comprises (1) dispersing the powder in a liquid media maintained at a pH such that the zeta potential of the powder is displaced from its isoelectric point (2) admixing a solution containing a compound having a metal ion coupled to an anion selected from oxygen and nitrogen completely dissolved in said solution and admixture, such that the portion of the compound having said metal ion in solution has a charge opposite that of the zeta potential of the dispersed powder such that said compound is chemisorbed to the surface of the powder.

18. A method of forming a uniform chemisorbed layer of a sintering aid on silicon nitride powder comprises
 a) selecting a powder having a negative zeta potential at a pH in excess of 6,
 b) forming an aqueous dispersion of said powder,
 c) adding said dispersion to a solution comprising at least one organometallic complex formed from a member of the group consisting of chromium methacrylate, chromium formate and aluminum lactate, the pH being maintained in excess of pH 6 and allowing the metal complex to chemisorb onto the surface of the powder, and
 d) separating the powder from the aqueous dispersion.

19. The method recited in claim 18 further comprising the steps of drying the powder after the separation step and admixing therewith up to 2 wt. % magnesium oxide powder.

20. The method recited in claim 18 further comprising the step of densifying said powder after the separation step.

* * * * *